(12) United States Patent
Popat et al.

(10) Patent No.: US 10,546,507 B2
(45) Date of Patent: Jan. 28, 2020

(54) RECOMMENDING A SET OF LEARNING ACTIVITIES BASED ON DYNAMIC LEARNING GOAL ADAPTATION

(71) Applicant: International Business Machines Corporation, Armonk, NY (US)

(72) Inventors: Kashyap Popat, Bangalore (IN); Nidhi Rajshree, San Jose, CA (US); Bikram Sengupta, Karnataka (IN); Ashay Tamhane, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 14/489,803

(22) Filed: Sep. 18, 2014

(65) Prior Publication Data

US 2016/0086498 A1 Mar. 24, 2016

(51) Int. Cl.
*G09B 5/00* (2006.01)

(52) U.S. Cl.
CPC ..................... *G09B 5/00* (2013.01)

(58) Field of Classification Search
CPC . G09B 5/00; G09B 19/06; G09B 7/02; G09B 5/08; G09B 7/04; G06Q 30/06
USPC ................. 434/107, 322, 350, 362
See application file for complete search history.

(56) References Cited

U.S. PATENT DOCUMENTS

| | | | | |
|---|---|---|---|---|
| 5,954,510 A | * | 9/1999 | Merrill | G09B 7/04 434/107 |
| 7,895,102 B1 | * | 2/2011 | Wilks | G06Q 30/06 434/362 |

| | | | |
|---|---|---|---|
| 2004/0014017 A1 | 1/2004 | Lo | |
| 2005/0277099 A1 | 12/2005 | Van Schaack et al. | |
| 2011/0039246 A1 | 2/2011 | Packard et al. | |
| 2013/0016044 A1 | 1/2013 | Nguyen et al. | |

(Continued)

OTHER PUBLICATIONS

Knewton, An Introduction to Knewton: Education's Most Powerful Data Infrastructure Platform, Jun. 2013, http://www.knewton.com/assets-v2/downloads/knewton-adaptive-learning-intro.pdf.

(Continued)

*Primary Examiner* — Eddy Saint-Vil
(74) *Attorney, Agent, or Firm* — Ryan, Mason & Lewis, LLP

(57) ABSTRACT

Methods, systems, and computer program products for recommending a set of learning activities are provided herein. A method includes determining a set of learning goals for a student based on an existing knowledge state and identified interests; calculating a probability value of the student succeeding in each of the learning goals in the set; selecting learning goals from the set for the student based on the existing knowledge state, a learning style associated with the student, historical data pertaining to additional students, the probability values, and an exploration threshold; outputting a first recommendation comprising a first sequence of learning activities corresponding to said selected learning goals; monitoring performance of the student; updating the existing knowledge state, learning style, identified interests, and exploration threshold; using the updated parameters to modify the learning goals; and outputting a second recommendation comprising a second sequence of learning activities corresponding to said modified learning goals.

18 Claims, 4 Drawing Sheets

(56) References Cited

U.S. PATENT DOCUMENTS

| | | | |
|---|---|---|---|
| 2013/0260352 A1* | 10/2013 | Abraham | G09B 7/02 434/350 |
| 2013/0280690 A1 | 10/2013 | Menon et al. | |
| 2014/0170629 A1* | 6/2014 | Keim | G09B 19/06 434/362 |
| 2015/0050637 A1* | 2/2015 | James-Hatter | G09B 5/08 434/362 |

OTHER PUBLICATIONS

Limongelli et al. Adaptive Learning with the LS-Plan System: A Field Evaluation, Universita Degli Studi di Roma Tre, Dipartimento di Informatica e Automazione, 2009.

* cited by examiner

RECOMMENDING A SET OF LEARNING ACTIVITIES BASED ON DYNAMIC LEARNING GOAL ADAPTATION

FIELD OF THE INVENTION

Embodiments of the invention generally relate to information technology, and, more particularly, to adaptive learning techniques.

BACKGROUND

Existing technology-based learning environments and approaches face multiple challenges. For example, such approaches are commonly restrictive, wherein the teacher or instructor defines the learning goals for a student based on fixed, pre-defined curriculum standards. In the current adaptive approaches, students work towards the same goal, but follow potentially different paths, as determined by the given platform. In such approaches, paths can be personalized, but goals are not. Also, by fixing learning goals and paths for each student, current adaptive approaches discourage knowledge exploration that can allow the inherent strengths and/or interests of a student to naturally surface. Consequently, such existing approaches do not capture the interest(s) of the student or incorporate such interest(s) into the determination of the composition or sequence of learning topics or activities. Further, such approaches do not include a capability to adapt or evolving with student interest, which may change over time.

Also, some existing technology-based learning approaches are self-regulative, wherein the entirety of a knowledge or concept area is exposed to a given student and the student is left to decide how to navigate the material without prescribing a fixed learning goal for the given student (or applying a uniform standard across all students). Consequently, such approaches similarly do not capture the current or evolving interest(s) of the student or incorporate such interest(s) into the determination of the composition or sequence of learning topics or activities.

Accordingly, in light of such challenges, a need exists for personalized and adaptive learning techniques which also dynamically adapt the learning goal as the learner makes progress with his or her learning activities on a given platform.

SUMMARY

In one aspect of the present invention, techniques for recommending a set of learning activities based on dynamic learning goal adaptation are provided. An exemplary computer-implemented method can include steps of determining an initial set of multiple learning goals for a given student based on at least (i) an existing knowledge state of the given student and (ii) one or more identified interests of the given student; and calculating a probability value of the given student succeeding in each of the multiple learning goals in the initial set, wherein said calculating is based on at least (i) the existing knowledge state of the given student and (ii) historical data pertaining to multiple additional students. The method also includes steps of selecting one or more learning goals from the initial set for the given student based on at least (i) the existing knowledge state of the given student, (ii) a determined learning style associated with the given student, (iii) historical data pertaining to multiple additional students, (iv) the probability value of the given student succeeding in each of the multiple learning goals in the initial set and (v) an exploration threshold associated with the given student, wherein the exploration threshold represents a measure of autonomy for academic investigation afforded to the given student at a given time; and outputting a first recommendation comprising a first sequence of multiple learning activities corresponding to said one or more selected learning goals. Further, the method includes steps of monitoring performance of the given student over the sequence of multiple learning activities; updating (i) the existing knowledge state of the given student, (ii) the determined learning style associated with the given student, (iii) the one or more identified interests of the given student, and (iv) the exploration threshold associated with the given student based on said monitoring; using the updated (i) knowledge state of the given student, (ii) learning style associated with the given student, (iii) one or more identified interests of the given student, and (iv) exploration threshold associated with the given student to modify the one or more selected learning goals for the given student; and outputting a second recommendation comprising a second sequence of multiple learning activities corresponding to said one or more modified learning goals.

In another aspect of the invention, an exemplary computer-implemented method can include steps of determining (i) an existing knowledge state of the given student and (ii) a learning style associated with the given student using one or more questionnaires; determining an initial set of multiple learning goals for the given student based on at least (i) the existing knowledge state of the given student and (ii) one or more identified interests of the given student; and calculating a probability value of the given student succeeding in each of the multiple learning goals in the initial set, wherein said calculating is based on at least (i) the existing knowledge state of the given student and (ii) historical data pertaining to multiple additional students. The method also includes selecting one or more learning goals from the initial set for the given student based on at least (i) the existing knowledge state of the given student, (ii) the determined learning style associated with the given student, (iii) historical data pertaining to multiple additional students, (iv) the probability value of the given student succeeding in each of the multiple learning goals in the initial set and (v) an exploration threshold associated with the given student, wherein the exploration threshold represents a measure of autonomy for academic investigation afforded to the given student at a given time; and outputting a first recommendation comprising a first sequence of multiple learning activities corresponding to said one or more selected learning goals. Further, the method includes steps of monitoring the given student to capture the given student's performance of the sequence of multiple learning activities; and updating (i) the existing knowledge state of the given student, (ii) the determined learning style associated with the given student, (iii) the one or more identified interests of the given student, and (iv) the exploration threshold associated with the given student based on said monitoring. Additionally, the method includes steps of using the updated (i) knowledge state of the given student, (ii) learning style associated with the given student, (iii) one or more identified interests of the given student, and (iv) exploration threshold associated with the given student to modify the one or more selected learning goals for the given student; outputting an updated recommendation comprising an updated sequence of multiple learning activities corresponding to said one or more modified learning goals; and repeating (i) said monitoring, (ii)

said updating, (iii) said using, and (iv) said outputting an updated recommendation steps for a given number of iterations.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
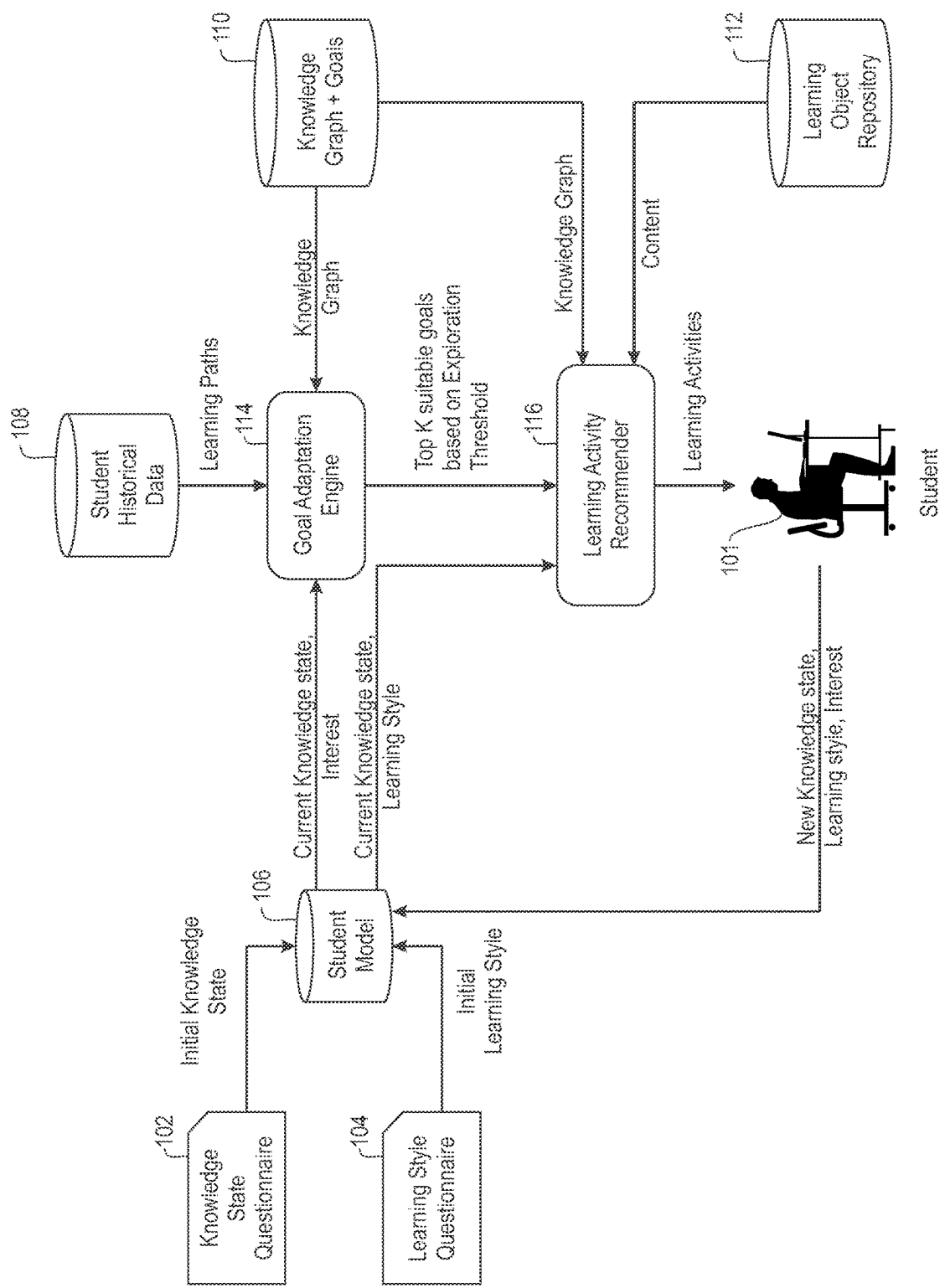
FIG. 1 is a diagram illustrating an example embodiment of the invention.

As described herein, an aspect of the present invention includes techniques for guided educational navigation via dynamic learning goal adaptation. At least one embodiment of the invention includes adaptively determining learning goals for a given student, and recommending one or more sequences of learning activities to the given student related to the goals, based on the given student's interest and performance.

Such an embodiment includes calculating an initial set of multiple learning goals for the given student based on the given student's existing knowledge state, the given student's identified and/or determined interests, and/or teacher or instructor input. For each learning goal in the initial set, a learning path is calculated for the given student based on his or her knowledge state and learning style. Such an embodiment also includes recommending an initial set of learning activities encompassed by the calculated learning path to the given student.

As used herein, the term learning styles encompasses individuals' natural or habitual pattern of acquiring and processing information in learning situations (for example, a visual style, an auditory style, a tactile style, etc.).

At least one embodiment of the invention can additionally include calculating the probability of the given student succeeding in one or more goals from the initial set of learning goals based on the given student's current knowledge state, as well as historical data pertaining to other students and corresponding learning paths. The probability values are determined using machine learning techniques such as, for example, Probabilistic Graphical Models (PGM). Based on the data from past students, a graphical model is trained. Additionally, at least one embodiment of the invention can include an active learning process, which includes learning the probability values as more and more students generate data. A purpose of this probability calculation is to make sure that the system only suggests learning goals with reasonable or sufficient chances of being achieved for a particular student. An exploration threshold, as detailed herein, will assist in deciding whether to consider a particular goal or not.

Accordingly, one or more embodiments of the invention include calculating and updating an exploration threshold for a given student. As used herein, an "exploration threshold" (th) represents a value which determines the freedom for academic investigation given to the student at a given time (t). An exploration threshold is a function of (i) the success probability values ($P_c$) for different goals at a given time, and (ii) at the given time, the distance to different goals in the knowledge graph from the current concept (distanceToGoals). In at least one embodiment of the invention, an exploration threshold (th) is calculated as follows: th=f($P_c$, distanceToGoals, t).

A low value of exploration threshold indicates a high degree of academic freedom. Initially, the threshold can be very low (indicating high exploration freedom), which allows a student to explore many learning goals. As the student progresses and the system collects sufficient evidences to identify interests of the student, the exploration threshold will increase, which will restrict the exploration freedom.

Additionally, as a given student proceeds through a recommendation of multiple learning activities, one or more embodiments of the invention includes adaptively updating the given student's knowledge state and learning style based on the learning activities selected and/or undertaken by the given student. Also, such an embodiment of the invention further includes identifying one or more relevant learning goals for the given student based on his or her interest and performance in the selected and/or undertaken learning activities. An additional and/or updated learning path corresponding to the identified goals can be calculated for the given student based on his or her updated performance and learning style. Further, such an embodiment of the invention can additionally include recommending an additional and/or updated subsequent set of learning activities to the given student based on the updated goals, performance and learning style of the given student.

Accordingly, at least one embodiment of the invention includes computing sets of learning goals that are progressively narrowed as the given student makes progress with his or her learning activities, and evidence and/or progress-related information is collected in favor (or otherwise) of each potential goal.

FIG. 1 is a diagram illustrating an example embodiment of the invention. By way of illustration, FIG. 1 depicts a student 101, a knowledge state questionnaire 102, a learning style questionnaire 104, a student model database 106 and a student historical data database 108. Further, FIG. 1 also depicts a knowledge graph and goals database 110, a learning object repository 112, a goal adaptation engine 114 and a learning activity recommender component 116.

As illustrated in FIG. 1, the initial knowledge state of a given student is determined and/or collected using pre-tests and/or knowledge state questionnaires 102, while the initial learning style of the student is determined and/or collected using learning style questionnaires 104 such as, for example, the Index of Learning Styles (ILS) questionnaire. The information collected via questionnaires 102 and 104 is stored in the student model database 106.

From the student model database 106, knowledge state and learning style information is provided to the goal adaptation engine 114, which also receives input from the student historical data database 108. Accordingly, the goal adaptation engine 114 uses the student's knowledge state, learning style, other students' historical data of learning paths, and knowledge graph data (derived from database 110) to calculate the probability of success in multiple different learning goals. Such a calculation can be carried out, for example, using machine learning (ML) techniques such as PGM.

As used herein, a knowledge graph is a directed graph in which a node represents a learning concept, and an edge between two nodes represents the dependency between two concepts. An edge A→B indicates that concept A is required to be completed before learning concept B. In one or more embodiments of the invention, there will be a starting node in the graph which will be connected to all of the basic concepts in the knowledge graph, and all paths from the starting node will end at some goal.

The goal adaptation engine 114 also calculates an exploration threshold (as detailed herein) based on the probability values of succeeding in different goals, and the distance to the different goals in the knowledge graph. The knowledge state of a student will help in determining the probability of succeeding in different goals, which will, in turn, help in calculating the exploration threshold. For example, the recommendation can include a pre-determined number of goals (the top K goals, for instance) based on a threshold value associated with the calculated probability of success of the student in multiple different goals.

The recommended goals are identified and provided to the learning activity recommender 116, which calculates the learning path to correspond with each goal based on the student's knowledge state. Also, the learning activity recommender 116 identifies a subsequent set (for example, the next set) of concepts to be recommended to the student, and identifies suitable content from database 112 for the subsequent set of concepts based on the student's learning styles. Database 112 contains a set of concepts along with the content required to learn those concepts. As used herein, a concept is a mastery level (for example, "learn to add two digits number") and the corresponding content is the material required to achieve the corresponding mastery level.

Based on this identified content, the learning activity recommender 116 recommends learning activities to the student that are associated with the content. Learning activities are part of the content in database 112. Such activities can include, for example, reading pages and completing a quiz, performing an experiment and reporting the results, etc.

As the student works through the content, at least one embodiment of the invention includes capturing the student's performance and updating his or her knowledge state, learning style, and interests. Additionally, as depicted in FIG. 1, such an embodiment of the invention includes using the updated information (which can be encompassed within an updated student model) to adapt the learning goals for the student and recommend a subsequent set of learning activities.

Figure 2:
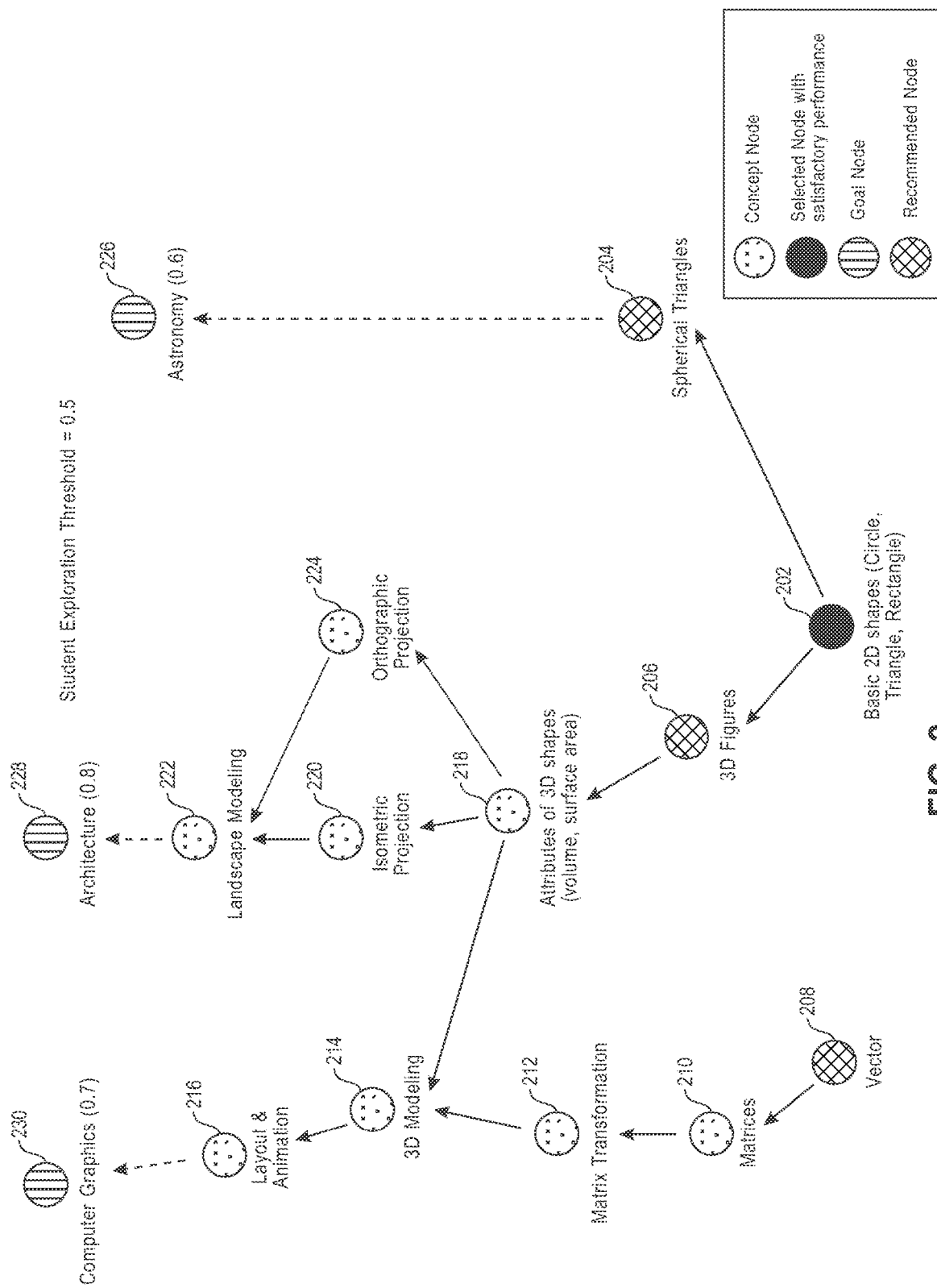
FIG. 2 is a diagram illustrating an example knowledge graph, in accordance with at least one embodiment of the invention.

FIG. 2 is a diagram illustrating an example knowledge graph, in accordance with at least one embodiment of the invention. By way of illustration, FIG. 2 depicts a selected node 202 with satisfactory student performance (that is, satisfactory for the student to proceed beyond that topic). In the example depicted in FIG. 2, the selected node 202 corresponds with the topic of basic two-dimensional (2D) shapes (circles, triangles, rectangles, etc.). Given that the selected node 202 is associated with satisfactory performance, the student can opt to proceed, for example, to one of the nodes recommended by one or more embodiments of the invention. In the FIG. 2 example, the recommended nodes are represented by node 204 (corresponding with the topic of special triangles), node 206 (corresponding with the topic of three-dimensional (3D) figures), and node 208 (corresponding with the topic of vectors).

From node 208, a learning path is depicted that includes concept node 210 (corresponding with the topic of matrices), concept node 212 (corresponding with the topic of matrix transformation), concept node 214 (corresponding with the topic of three-dimensional (3D) modeling), concept node 216 (corresponding with the topic of layout and animation), and goal node 230 (corresponding with the topic of computer graphics), wherein goal node 230 has a probability value of 0.7, which indicates the probability of the given student achieving the goal 230.

Also from node 202, a learning path is depicted that includes recommended node 206, concept node 218 (corresponding with the topic of attributes of 3D shapes), concept node 220 (corresponding with the topic of isometric projection), concept node 224 (corresponding with the topic of orthographic projection), concept node 222 (corresponding with the topic of landscape modeling), and goal node 228 (corresponding with the topic of architecture), wherein goal node 228 has a probability value of 0.8, which indicates the probability of the given student achieving the goal 228.

Additionally, from node 204, a learning path is depicted that includes goal node 226 (corresponding with the topic of astronomy), wherein goal node 226 has a probability value of 0.6, which indicates the probability of the given student achieving the goal 226. For all of the noted goals (that is, goals 226, 228, and 230), the probability of succeeding is greater than the exploration threshold (that is, 0.5). Accordingly, the next set of activities can be suggested based on all three goals. Had the probability of success for one of the goals been less than the exploration threshold, the system would have not recommended the activities for that particular goal.

As described below, at least one embodiment of the invention includes executing one or more algorithms in furtherance of the techniques detailed herein. Consider, by way of example, the following. An algorithm implemented in an example embodiment of the invention can include a graph G(V, E), wherein V refers to concept nodes, and E refers to concept dependencies. Additionally, one or more additional algorithms can include the following variables: $K_t$ refers to a set of concepts known to student at step t; C refers to a subset of V which are a set of possible goals; A refers to a subset of C which are set to be the student's goals; $P_C$ refers to each term in this set that denotes the probability of the student succeeding in the corresponding goals in C; I refers to the initial set of concepts known to the student; S refers to the initial set of goals for the student.

Additionally, one or more embodiments of the invention can include incorporating functions such as implementing a graphical model (M) for predicting performance in goals, a function to determine if goals are expected to be achieved, a function to change one or more goals (change_goal), a function to fetch one or more nodes given identified goals (fetch_next_nodes), and a function to traverse a concept graph.

Accordingly, an example embodiment of the invention includes initializing $K_0$ with I and initializing A with S for time (t)=0. Also, such an embodiment includes iterating a determination of learning paths using the following computations:

$P_c=M(K_t, C)$ to learn the probability distribution over C based on the student's current knowledge;

distanceToGoals=getDistanceValues(C, t) (wherein distanceToGoals refers to the set of distance values from the current concept to the different goals at a given time t);

$th_t$=calculateNewThreshold($P_c$, distanceToGoals, t);

A=change_goal ($P_c$, $th_t$);

N=fetch_next_nodes($K_t$, A, paths) to fetch the next set of nodes to be covered based on the student's current knowledge (wherein N refers to next set of concepts (nodes) to be covered by the student);

$K_{t+1}$=attempt($K_t$, N) to determine an updated set of knowledge values after learning; and t=t+1; to update the timestamp.

Additionally, one or more embodiments of the invention include computations such as attempt($K_t$, N), wherein a student selects a node (thereby showing interest) and attempts the node, and consequently $K_t$ is updated and returned. Additional computations can include, for example, fetch_next_nodes($K_t$, A, paths), wherein for each goal 'a' in A, the first node (n) which is not visited in the path to goal 'a' is determined, and N is updated and returned. Also, with respect to fetch_next_nodes($K_t$, A, paths), "paths" is a collection of all of the paths obtained using a breadth first traversal from the starting node to each goal node in the knowledge graph. Further, additional computations can include change_goal($P_c$), wherein a set of goals (A) is selected based on a threshold, and A is returned.

Also, at least one embodiment of the invention includes implementing $M(K_t, C)$, which is a model learned using PGM based on training data from past and/or additional students. This function solves the conditional probability queries for $C_{i=1\ to\ |C|}$, such as $P(C_1|K_t)$, $P(C_2|K_t)$ ... $P(C_{|C|}|K_t)$.

Figure 3:
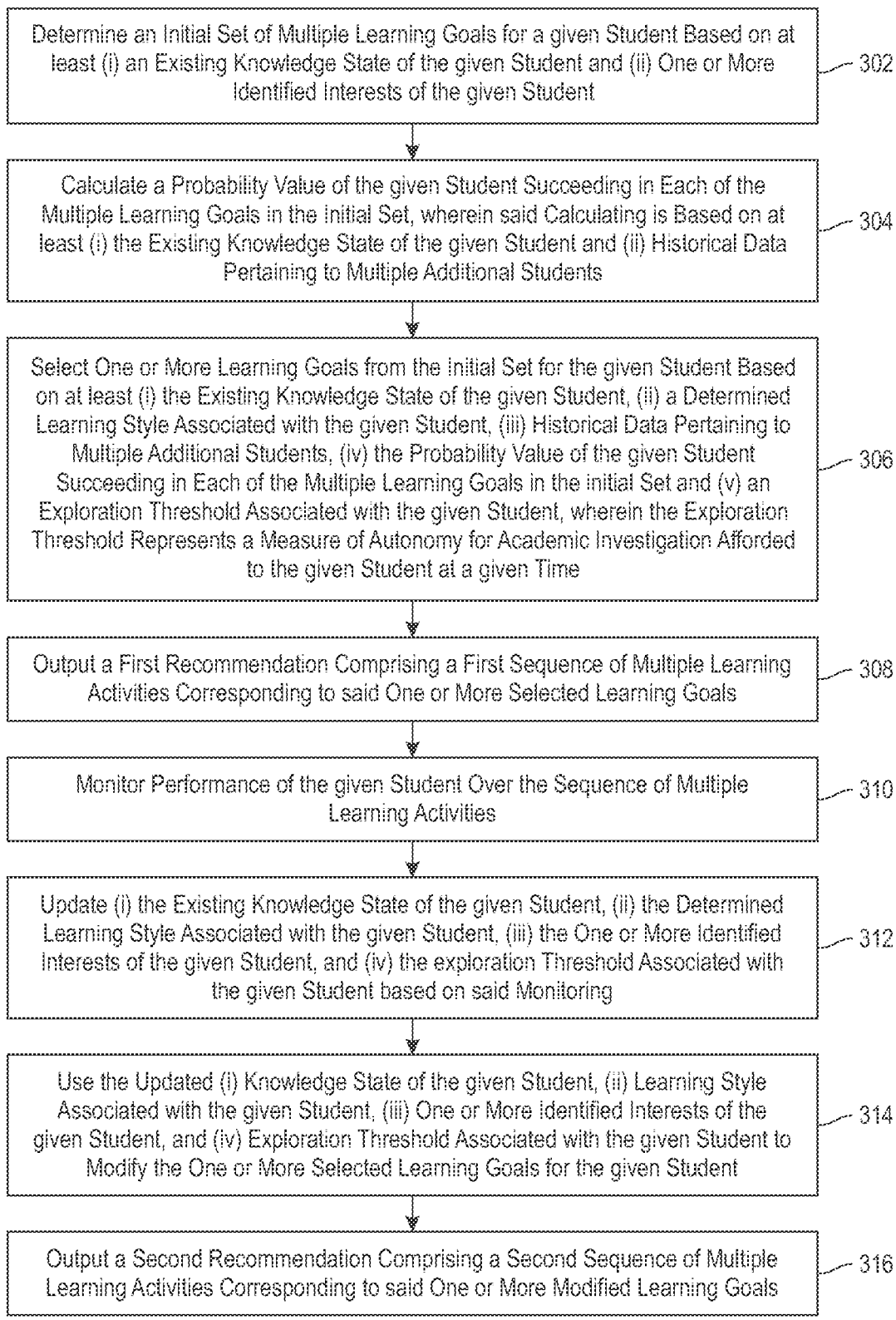
FIG. 3 is a flow diagram illustrating techniques according to an embodiment of the invention.

FIG. 3 is a flow diagram illustrating techniques according to an embodiment of the present invention. Step 302 includes determining an initial set of multiple learning goals for a given student based on at least (i) an existing knowledge state of the given student and (ii) one or more identified interests of the given student.

Step 304 includes calculating a probability value of the given student succeeding in each of the multiple learning goals in the initial set, wherein said calculating is based on at least (i) the existing knowledge state of the given student and (ii) historical data pertaining to multiple additional students. In at least one embodiment of the invention, this calculating step can include using one or more machine learning techniques.

Step 306 includes selecting one or more learning goals from the initial set for the given student based on at least (i) the existing knowledge state of the given student, (ii) a determined learning style associated with the given student, (iii) historical data pertaining to multiple additional students, (iv) the probability value of the given student succeeding in each of the multiple learning goals in the initial set and (v) an exploration threshold associated with the given student, wherein the exploration threshold represents a measure of autonomy for academic investigation afforded to the given student at a given time. In at least one embodiment of the invention, the selected learning goals can include a predetermined number of goals based on a threshold value associated with the calculated probability values.

Step 308 includes outputting a first recommendation comprising a first sequence of multiple learning activities corresponding to the one or more selected learning goals. Step 310 includes monitoring performance of the given student over the sequence of multiple learning activities. Step 312 includes updating (i) the existing knowledge state of the given student, (ii) the determined learning style associated with the given student, (iii) the one or more identified interests of the given student, and (iv) the exploration threshold associated with the given student based on said monitoring.

Step 314 includes using the updated (i) knowledge state of the given student, (ii) learning style associated with the given student, (iii) one or more identified interests of the given student, and (iv) exploration threshold associated with the given student to modify the one or more selected learning goals for the given student. Step 316 includes outputting a second recommendation comprising a second sequence of multiple learning activities corresponding to the one or more modified learning goals.

The techniques depicted in FIG. 3 can additionally include calculating the exploration threshold associated with the given student based on (i) the probability value of the given student succeeding in each of the multiple learning goals in the initial set, and (ii) distance values to one or more goals in a given knowledge graph at a given time. Further, the techniques depicted in FIG. 3 can include storing, in a database, the one or more identified interests of the given student, the existing knowledge state of the given student, the determined learning style associated with the given student, the probability value of the given student succeeding in each of the multiple learning goals in the initial set, the first sequence of multiple learning activities corresponding to said one or more selected learning goals, and/or the second sequence of multiple learning activities corresponding to said one or more modified learning goals.

Also, in connection with the techniques depicted in FIG. 3, at least one embodiment of the invention additionally includes determining (i) an existing knowledge state of the given student and (ii) a learning style associated with the given student using one or more questionnaires. Such an embodiment of the invention also includes outputting an updated recommendation comprising an updated sequence of multiple learning activities corresponding to the one or more modified learning goals, and repeating the monitoring, updating, using, and outputting an updated recommendation steps for a given number of iterations. Further, such an embodiment can additionally include storing the first sequence of multiple learning activities in a database, as well as storing each updated sequence of multiple learning activities in a database.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
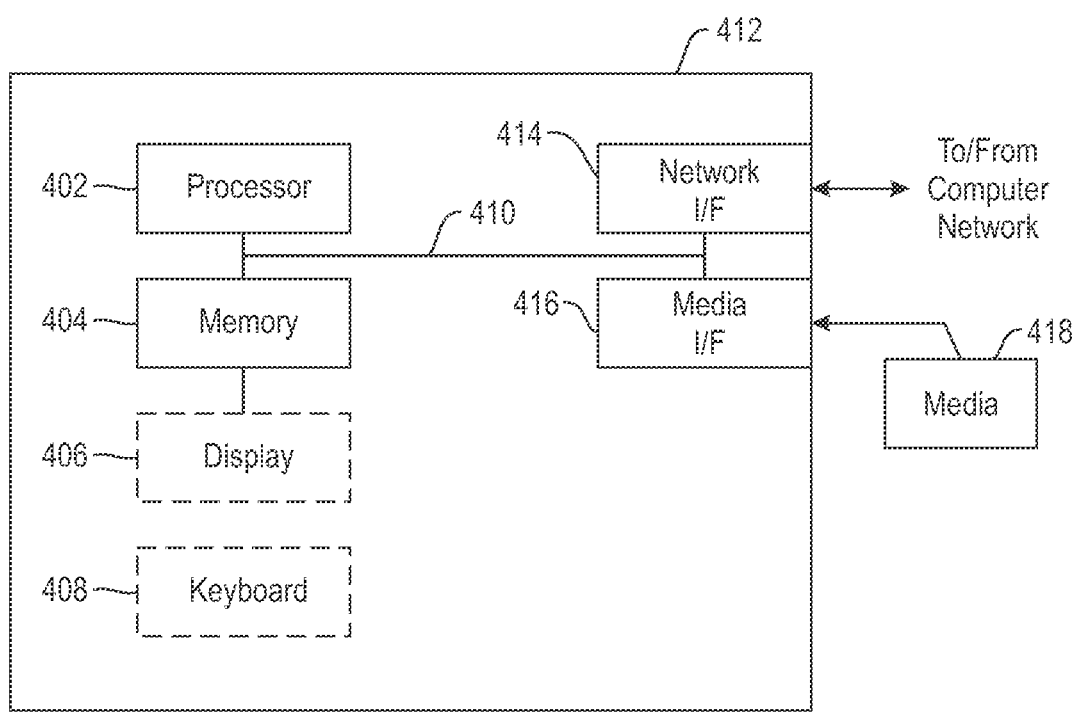
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, calculating and adjusting a learning path for a given student based on the knowledge state and learning style of the student.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

determining an initial set of multiple learning goals for a given student based on at least (i) an existing knowledge state of the given student and (ii) one or more identified interests of the given student;

calculating a probability value of the given student succeeding in each of the multiple learning goals in the initial set, wherein said calculating is based on at least (i) the existing knowledge state of the given student and (ii) historical data pertaining to multiple additional students, wherein said calculating comprises using one or more machine learning techniques comprising one or more probabilistic graphical models, and wherein the one or more machine learning techniques are configured to:

train the one or more probabilistic graphical models on the historical data pertaining to multiple additional students; and learn the probability value of the given student succeeding in each of the multiple learning goals in the initial set based at least in part on the trained probabilistic graphical models and implementation of one or more active learning processes;

selecting one or more of the multiple learning goals from the initial set for the given student based on at least (i) the existing knowledge state of the given student, (ii) a determined learning style associated with the given student, (iii) historical data pertaining to the multiple additional students, (iv) the probability value of the given student succeeding in each of the multiple learning goals in the initial set and (v) an exploration threshold associated with the given student, wherein the exploration threshold (th) represents a measure of autonomy for academic investigation afforded to the given student at a given time (t), and wherein the exploration threshold is computed via th=f($P_c$, distanceToGoals, t), wherein $P_c$ represents the probability value of the given student succeeding in one or more of the multiple learning goals at the given time, and distanceToGoals represents the distance, at the given time, to the one or more of the multiple learning goals from a given concept in a knowledge graph;

outputting a first recommendation comprising a first sequence of multiple learning activities corresponding to said one or more selected learning goals of the multiple learning goals from the initial set;

monitoring performance of the given student over the sequence of multiple learning activities;

updating (i) the existing knowledge state of the given student, (ii) the determined learning style associated with the given student, (iii) the one or more identified interests of the given student, and (iv) the exploration threshold associated with the given student based on said monitoring;

using the updated (i) knowledge state of the given student, (ii) learning style associated with the given student, (iii) one or more identified interests of the given student, and (iv) exploration threshold associated with the given student to modify the one or more selected learning goals of the multiple learning goals from the initial set for the given student; and outputting a second recommendation comprising a second sequence of multiple learning activities corresponding to said one or more modified learning goals of the multiple learning goals from the initial set;

wherein the method is carried out by at least one computing device.

2. The method of claim 1, wherein said one or more selected learning goals of the multiple learning goals from the initial set comprises a pre-determined number of goals based on a threshold value associated with the calculated probability value of the given student succeeding in each of the multiple learning goals in the initial set.

3. The method of claim 1, comprising:

calculating the exploration threshold associated with the given student based on (i) the probability value of the given student succeeding in each of the multiple learning goals in the initial set, and (ii) distance values to one or more of the multiple learning goals in a given knowledge graph at the given time.

4. The method of claim 1, comprising:

storing the one or more identified interests of the given student in a database.

5. The method of claim 1, comprising:

storing the existing knowledge state of the given student in a database.

6. The method of claim 1, comprising:

storing the determined learning style associated with the given student in a database.

7. The method of claim 1, comprising:

storing the probability value of the given student succeeding in each of the multiple learning goals in the initial set in a database.

8. The method of claim 1, comprising:

storing the first sequence of multiple learning activities corresponding to said one or more selected learning goals of the multiple learning goals from the initial set in a database.

9. The method of claim 1, comprising:

storing the second sequence of multiple learning activities corresponding to said one or more modified learning goals of the multiple learning goals from the initial set in a database.

10. A computer program product, the computer program product comprising a computer readable storage medium having program instructions embodied therewith, the program instructions executable by a computing device to cause the computing device to:

determine an initial set of multiple learning goals for a given student based on at least (i) an existing knowledge state of the given student and (ii) one or more identified interests of the given student;

calculate a probability value of the given student succeeding in each of the multiple learning goals in the initial set, wherein said calculating is based on at least (i) the existing knowledge state of the given student and (ii) historical data pertaining to multiple additional students, wherein said calculating comprises using one or more machine learning techniques comprising one or more probabilistic graphical models, and wherein the one or more machine learning techniques are configured to:

train the one or more probabilistic graphical models on the historical data pertaining to multiple additional students; and learn the probability value of the given student succeeding in each of the multiple learning goals in the initial set based at least in part on the trained probabilistic graphical models and implementation of one or more active learning processes;

select one or more of the multiple learning goals from the initial set for the given student based on at least (i) the existing knowledge state of the given student, (ii) a determined learning style associated with the given student, (iii) historical data pertaining to the multiple additional students, (iv) the probability value of the given student succeeding in each of the multiple learning goals in the initial set and (v) an exploration threshold associated with the given student, wherein the exploration threshold (th) represents a measure of autonomy for academic investigation afforded to the given student at a given time (t), and wherein the exploration threshold is computed via th=f($P_c$, distanceToGoals, t), wherein $P_c$ represents the probability value of the given student succeeding in one or more of the multiple learning goals at the given time, and distanceToGoals represents the distance, at the given time, to the one or more of the multiple learning goals from a given concept in a knowledge graph;

output a first recommendation comprising a first sequence of multiple learning activities corresponding to said one or more selected learning goals of the multiple learning goals from the initial set;

monitor performance of the given student over the sequence of multiple learning activities;

update (i) the existing knowledge state of the given student, (ii) the determined learning style associated with the given student, (iii) the one or more identified interests of the given student, and (iv) the exploration threshold associated with the given student based on said monitoring;

use the updated (i) knowledge state of the given student, (ii) learning style associated with the given student, (iii) one or more identified interests of the given student, and (iv) exploration threshold associated with the given student to modify the one or more selected learning goals of the multiple learning goals from the initial set for the given student; and output a second recommendation comprising a second sequence of multiple learning activities corresponding to said one or more modified learning goals of the multiple learning goals from the initial set.

11. The computer program product of claim 10, wherein said one or more selected learning goals of the multiple learning goals from the initial set comprises a pre-determined number of goals based on a threshold value associated with the calculated probability value of the given student succeeding in each of the multiple learning goals in the initial set.

12. The computer program product of claim 10, wherein the program instructions executable by a computing device further cause the computing device to:

calculate the exploration threshold associated with the given student based on (i) the probability value of the given student succeeding in each of the multiple learning goals in the initial set, and (ii) distance values to one or more of the multiple learning goals in a given knowledge graph at the given time.

13. A system comprising:
a memory; and
at least one processor coupled to the memory and configured for:
determining an initial set of multiple learning goals for a given student based on at least (i) an existing knowledge state of the given student and (ii) one or more identified interests of the given student;

calculating a probability value of the given student succeeding in each of the multiple learning goals in the initial set, wherein said calculating is based on at least (i) the existing knowledge state of the given student and (ii) historical data pertaining to multiple additional students, wherein said calculating comprises using one or more machine learning techniques comprising one or more probabilistic graphical models, and wherein the one or more machine learning techniques are configured to:

train the one or more probabilistic graphical models on the historical data pertaining to multiple additional students; and learn the probability value of the given student succeeding in each of the multiple learning goals in the initial set based at least in part on the trained probabilistic graphical models and implementation of one or more active learning processes;

selecting one or more of the multiple learning goals from the initial set for the given student based on at least (i) the existing knowledge state of the given student, (ii) a determined learning style associated with the given student, (iii) historical data pertaining to the multiple additional students, (iv) the probability value of the given student succeeding in each of the multiple learning goals in the initial set and (v) an exploration threshold associated with the given student, wherein the exploration threshold (th) represents a measure of autonomy for academic investigation afforded to the given student at a given time (t), and wherein the exploration threshold is computed via th=f($P_c$, distanceToGoals, t), wherein $P_c$ represents the probability value of the given student succeeding in one or more of the multiple learning goals at the given time, and distanceToGoals represents the distance, at the given time, to the one or more of the multiple learning goals from a given concept in a knowledge graph;

outputting a first recommendation comprising a first sequence of multiple learning activities corresponding to said one or more selected learning goals of the multiple learning goals from the initial set;

monitoring performance of the given student over the sequence of multiple learning activities;

updating (i) the existing knowledge state of the given student, (ii) the determined learning style associated with the given student, (iii) the one or more identified interests of the given student, and (iv) the exploration threshold associated with the given student based on said monitoring;

using the updated (i) knowledge state of the given student, (ii) learning style associated with the given student, (iii) one or more identified interests of the given student, and (iv) exploration threshold associated with the given student to modify the one or more selected learning goals of the multiple learning goals from the initial set for the given student; and outputting a second recommendation comprising a second sequence of multiple learning activities corresponding to said one or more modified learning goals of the multiple learning goals from the initial set.

14. A method comprising:
determining (i) an existing knowledge state of the given student and (ii) a learning style associated with the given student using one or more questionnaires;

determining an initial set of multiple learning goals for the given student based on at least (i) the existing knowledge state of the given student and (ii) one or more identified interests of the given student;

calculating a probability value of the given student succeeding in each of the multiple learning goals in the initial set, wherein said calculating is based on at least (i) the existing knowledge state of the given student and (ii) historical data pertaining to multiple additional students, wherein said calculating comprises using one or more machine learning techniques comprising one or more probabilistic graphical models, and wherein the one or more machine learning techniques are configured to:

train the one or more probabilistic graphical models on the historical data pertaining to multiple additional students; and learn the probability value of the given student succeeding in each of the multiple learning goals in the initial set based at least in part on the trained probabilistic graphical models and implementation of one or more active learning processes;

selecting one or more of the multiple learning goals from the initial set for the given student based on at least (i) the existing knowledge state of the given student, (ii) the determined learning style associated with the given student, (iii) historical data pertaining to the multiple additional students, (iv) the probability value of the given student succeeding in each of the multiple learning goals in the initial set and (v) an exploration threshold associated with the given student, wherein the exploration threshold (th) represents a measure of autonomy for academic investigation afforded to the given student at a given time (t), and wherein the exploration threshold is computed via th=f($P_c$, distanceToGoals, t), wherein $P_c$ represents the probability value of the given student succeeding in one or more of the multiple learning goals at the given time, and distanceToGoals represents the distance, at the given time, to the one or more of the multiple learning goals from a given concept in a knowledge graph;

outputting a first recommendation comprising a first sequence of multiple learning activities corresponding to said one or more selected learning goals of the multiple learning goals from the initial set;

monitoring the given student to capture the given student's performance of the sequence of multiple learning activities;

updating (i) the existing knowledge state of the given student, (ii) the determined learning style associated with the given student, (iii) the one or more identified interests of the given student, and (iv) the exploration threshold associated with the given student based on said monitoring;

using the updated (i) knowledge state of the given student, (ii) learning style associated with the given student, (iii) one or more identified interests of the given student, and (iv) exploration threshold associated with the given student to modify the one or more selected learning goals of the multiple learning goals from the initial set for the given student;

outputting an updated recommendation comprising an updated sequence of multiple learning activities corresponding to said one or more modified learning goals of the multiple learning goals from the initial set; and repeating (i) said monitoring, (ii) said updating, (iii) said using, and (iv) said outputting an updated recommendation steps for a given number of iterations;

wherein the method is carried out by at least one computing device.

15. The method of claim 14, wherein said one or more selected learning goals of the multiple learning goals from the initial set comprises a pre-determined number of goals based on a threshold value associated with the calculated probability value of the given student succeeding in each of the multiple learning goals in the initial set.

16. The method of claim 14, comprising:
calculating the exploration threshold associated with the given student based on (i) the probability value of the given student succeeding in each of the multiple learning goals in the initial set, and (ii) distance values to one or more of the multiple learning goals in a given knowledge graph at the given time.

17. The method of claim 14, comprising:
storing the first sequence of multiple learning activities corresponding to said one or more selected learning goals of the multiple learning goals from the initial set in a database.

18. The method of claim 14, comprising:
storing each updated sequence of multiple learning activities in a database.

* * * * *